US008868268B2

(12) United States Patent
Sanders

(10) Patent No.: US 8,868,268 B2
(45) Date of Patent: Oct. 21, 2014

(54) SYSTEM AND METHOD FOR NAVIGATION FOR UNMANNED UNDERSEA VEHICLES

(71) Applicant: William M Sanders, New Orleans, LA (US)

(72) Inventor: William M Sanders, New Orleans, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/032,337

(22) Filed: Sep. 20, 2013

(65) Prior Publication Data

US 2014/0277864 A1 Sep. 18, 2014

Related U.S. Application Data

(60) Provisional application No. 61/777,094, filed on Mar. 12, 2013.

(51) Int. Cl.
*G05D 3/00* (2006.01)
*G05D 1/06* (2006.01)

(52) U.S. Cl.
CPC .................................. *G05D 1/0692* (2013.01)
USPC ........................................................ 701/21

(58) Field of Classification Search
USPC .............. 701/21; 181/110, 123, 140; 367/12, 367/87–88, 131, 141, 907; 398/104; 114/312, 331
See application file for complete search history.

(56) References Cited

U.S. PATENT DOCUMENTS

| 5,602,801 | A | * | 2/1997 | Nussbaum et al. | 367/165 |
| 6,370,085 | B1 | * | 4/2002 | Finkle et al. | 367/173 |
| 7,760,587 | B2 | * | 7/2010 | Abbot et al. | 367/131 |
| 8,305,841 | B2 | | 11/2012 | Riordan et al. | |
| 8,600,592 | B2 | * | 12/2013 | Heard et al. | 701/21 |
| 8,654,610 | B2 | * | 2/2014 | Megdal et al. | 367/117 |
| 2008/0165617 | A1 | * | 7/2008 | Abbot et al. | 367/3 |
| 2009/0103083 | A1 | * | 4/2009 | Kremeyer | 356/317 |
| 2011/0144836 | A1 | | 6/2011 | Larkin et al. | |
| 2012/0250006 | A1 | * | 10/2012 | Kremeyer | 356/72 |

FOREIGN PATENT DOCUMENTS

EP 2165214 A1 3/2010

OTHER PUBLICATIONS

Caress, D., Thomas, H., Kirkwood, W., McEwen, R., Henthorn, R., Clague, D., Paull, C., Paduan, J., High-Resolution multibeam, sidescan, and subbottom surveys using the MBARI AUV D. Allan B., Marine Habitat Mapping Technology for Alaska, J.R. Reynolds and H.G. Greene (eds.), Alaska Sea Grant College Program, University of Alaska Fairbanks. pp. 47-69, 2008.

(Continued)

*Primary Examiner* — Yonel Beaulieu
(74) *Attorney, Agent, or Firm* — US Naval Research Laboratory; Kathleen Chapman

(57) ABSTRACT

System and method for navigating an unmanned undersea vehicle (UUV) using three-dimensional acoustic reflectivity data sets and a beam steered downward looking sonar capturing sub-bottom features and creating three-dimensional representations to compare with the reflectivity data sets to general navigation corrections. Acoustically senses and exploits sub-bottom features for navigation of UUVs that can provide more reliable navigation than using surface features alone, since much of the sea floor is flat (e.g. on continental shelves and abyssal plains).

13 Claims, 7 Drawing Sheets
(4 of 7 Drawing Sheet(s) Filed in Color)

(56) References Cited

OTHER PUBLICATIONS

Caccia, M., Casalino, G., Cristi, R., Veruggio, G., Acoustic motion estimation and control for an unmanned underwater vehicle in a structured environment, Control Engineering Practice 6, pp. 661-670, 1998.

Williams, S., Mahon, I., Simultaneous localisation and mapping on the Great Barrier Reef, Proceedings of the International Conference on Robotics & Automation, pp. 1771-1776, New Orleans, LA, Apr. 2004.

Healey, A., Lienard, D., Multivariable sliding-mode control for autonomous diving and steering of unmanned underwater vehicles, IEEE Journal of Oceanic Engineering, vol. 18, No. 3, pp. 327-339, Jul. 1993.

Kocak, D. Crout, R. (eds.), The State of Technology in 2008, The International, Interdisciplinary Society Devoted to Ocean and Marine Engineering, Science and Policy, Marine Technology Society Journal, vol. 42, No. 1, Spring 2008.

Caccia, M., Veruggio, G., Guidance and control of a reconfigurable unmanned underwater vehicle, Control Engineering Practice 8., pp. 21-37, 2000.

Waldock, M., Roberts, G., Sutton, R., Terrain following control of an unmanned underwater vehicle using artificial neural networks, IEE Colloquium on Control and Guidance of Remotely Operated Vehicles, Savoy Place, London WC2R 0BL, 1995.

Paulino, N., Silvestre, C., Cunha, R., Pascoal, A., A bottom-following preview controller for autonomous underwater vehicles, Proceedings of the 45th IEEE Conference on Decision & Control, San Diego, CA, Dec. 13-15, 2006.

Di Massa, D., Stewart, W., Jr., Terrian-relative navigation for autonomous underwater vehicles, IEEE 0-7803-4108-2/97, pp. 541-546, 1997.

Molnar, L., Omerdic, E., Toal, D., Guidance, navigation and control system for the Tethra unmanned underwater vehicle, International Journal of Control, vol. 80, No. 7, pp. 1050-1076, 2007.

Williams, S., Pizarro, O., Mahon, I., Johnson-Roberson, M., Simultaneous localisation and mapping and dense stereoscopic seafloor reconstruction using an AUV, Experimental Robotics: The 11th International Symposium, STAR 54, Springer-Verlag Berlin Heidelberg pp. 407-416, 2009.

Sanders, W., U.S. Appl. No. 61/777,094, System and Method for Navigation for Unmanned Undersea Vehicles, filed Mar. 12, 2013.

Sub-bottom profiling, Ocean Systems website, http://www.oceansystemsii.com/proddetail.asp?prod=Sub-bottomProfiling, Ocean Systems International, Inc., 8711 Boca Ciega Drive, St. Petersburg, FL 33706, (727) 360-1660, downloaded on Dec. 9, 2011.

* cited by examiner

SYSTEM AND METHOD FOR NAVIGATION FOR UNMANNED UNDERSEA VEHICLES

CROSS-REFERENCE TO RELATED APPLICATIONS

This application claims the benefit of priority based on U.S. Provisional Patent Application No. 61/777,094, entitled SYSTEM AND METHOD FOR NAVIGATION FOR UNMANNED UNDERSEA VEHICLES, filed on Mar. 12, 2013, the entirety of which is hereby incorporated by reference into the present application.

BACKGROUND

Methods and systems disclosed herein relate generally to unmanned underwater vehicles (UUVs) and more specifically to navigation for UUVs.

UUVs are expected to perform missions previously assigned to manned vessels. Autonomous navigation for these vehicles is a technical challenge, certainly a critical performance factor. The race to find accurate and robust navigation methods is a key part of UUV development. Use of UUVs to replace manned platforms can potentially save billions of dollars, remove sailors from risky environments, and reduce greenhouse gas emissions. Currently, navigation is performed by communication between the UUV and a host ship.

Terrain following navigation, which has worked well for unmanned aerial vehicles, has been proposed for UUVs. However, much of the ocean is devoid of terrain features. Terrain following vehicles transiting long distances would require powerful sonars which sense a wide footprint of the ocean floor. Certain bottom-following controllers designed for UUVs take into account the bathymetric characteristics ahead of the UUV as measured by echo sounders. Navigation off two-dimensional surface elevation terrain data sets has been performed, but in demonstrations, the elevation varied by more than 800 m in a 3.6 km distance, corresponding to at least a 13° slope (the average slope on the continental shelf is about 0.1°).

A normal incidence (unsteered) beam has been used that collects a depth profile of acoustic reflectivity along a track over which the UUV progresses. Being two-dimensional, this method cannot be used for navigation.

What are needed are systems and methods for navigating UUVs and ultimately for replacing manned platforms with UUVs. What are further needed are systems and methods for acoustically sensing and exploiting sub-bottom features (e.g. sand/mud layers, linear features like pipelines, or point scatterers, such as shells) for navigation of UUVs. What is still further needed is a system that includes a three dimensional data set provided by a sub-bottom profiler (SBP) and achieved through beam steering. Bottom-penetrating sonar could sense features in the sub-bottom to use for navigation. Depending on the morphology of a specific area, it is expected that the sub-bottom would be richer in features than much of the seafloor. Given that little of the seafloor sub-bottom structure has been mapped, navigation from sub-bottom features may require a pre-mission survey. This task can also be performed by a UUV in a less time-constrained period than an actual operational cruise. Known features, such as, for example, but not limited to, buried pipelines or cables, could be exploited. In this situation, a prior survey may not be required. The point of navigating off sub-bottom features to diminish the reliance on the rare areas of the ocean where there are terrain features distinct and dramatic enough to reliably navigate off of.

SUMMARY

The system and method of the present embodiment for acoustically sensing and exploiting sub-bottom features for navigation of UUVs can provide more reliable navigation than using surface features alone, since much of the sea floor is flat (e.g. on continental shelves and abyssal plains). Even when there are sea surface features, they may appear flat to a sensor, for example, a sonar, depending on the scale of the feature and the frequency and footprint of the sensor.

The method of the present embodiment for navigating a UUV can include, but is not limited to including, receiving a plurality of three dimensional acoustic reflectivity reference data sets, each of the plurality of reference data sets being associated with a reference location, receiving sonar data from a UUV equipped with a beam steered downward looking sonar, the sonar producing a sonar beam that penetrates the seafloor, the sonar beam producing several echoes from at least one sub-bottom feature, the sonar beam producing the sonar data from the echo, accumulating the sonar data to produce a three-dimensional representation of at least one sub-bottom feature, locating a match between the three-dimensional representation and one of the plurality of reference representations, and combining location of the matched reference feature with navigation data sensed by the UUV to navigate the UUV.

The system of the present teachings can include, but is not limited to including, an input processor receiving, for example, but not limited to, a narrow beam, electronically steered and bottom-penetrating sonar sensing sub-bottom features, a CPU processing UUV data and reference data, and producing navigation information for the UUV. The system of the present teachings can allow a UUV to follow known/manmade sub-surface features for example, but not limited to, pipelines. This system can also include attitude sensors, a waveform generator, a power supply, and a UUV controller. The narrow angle, downward looking sonar can be mounted on the bottom of a UUV. As the UUV moves forward, the sonar beam sweeps at athwartships angles and penetrates the seafloor, where sub-bottom features are revealed in the returned echo. Each ping of the sonar ensonifies a different area of the seafloor—a "footprint". As the UUV moves forward, a three dimensional image of the sea floor is compiled, the three dimensions being length (in direction of motion), width (athwartship sweep angle) and depth. Attitude sensors provide estimates of vehicle roll and pitch. These and vehicle navigation data (position, speed, heading) are required for navigation. The system can provide sub-bottom feature recognition, course correction to match expected features, and electronic steering for the narrow-beam, bottom-penetrating sonar. The system can provide highly accurate navigation, robust terrain-following, covert sensing, and reduced power consumption compared to the prior art.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

DETAILED DESCRIPTION

These solutions and other advantages are achieved by the various embodiments of the teachings described herein below.

Figure 1:
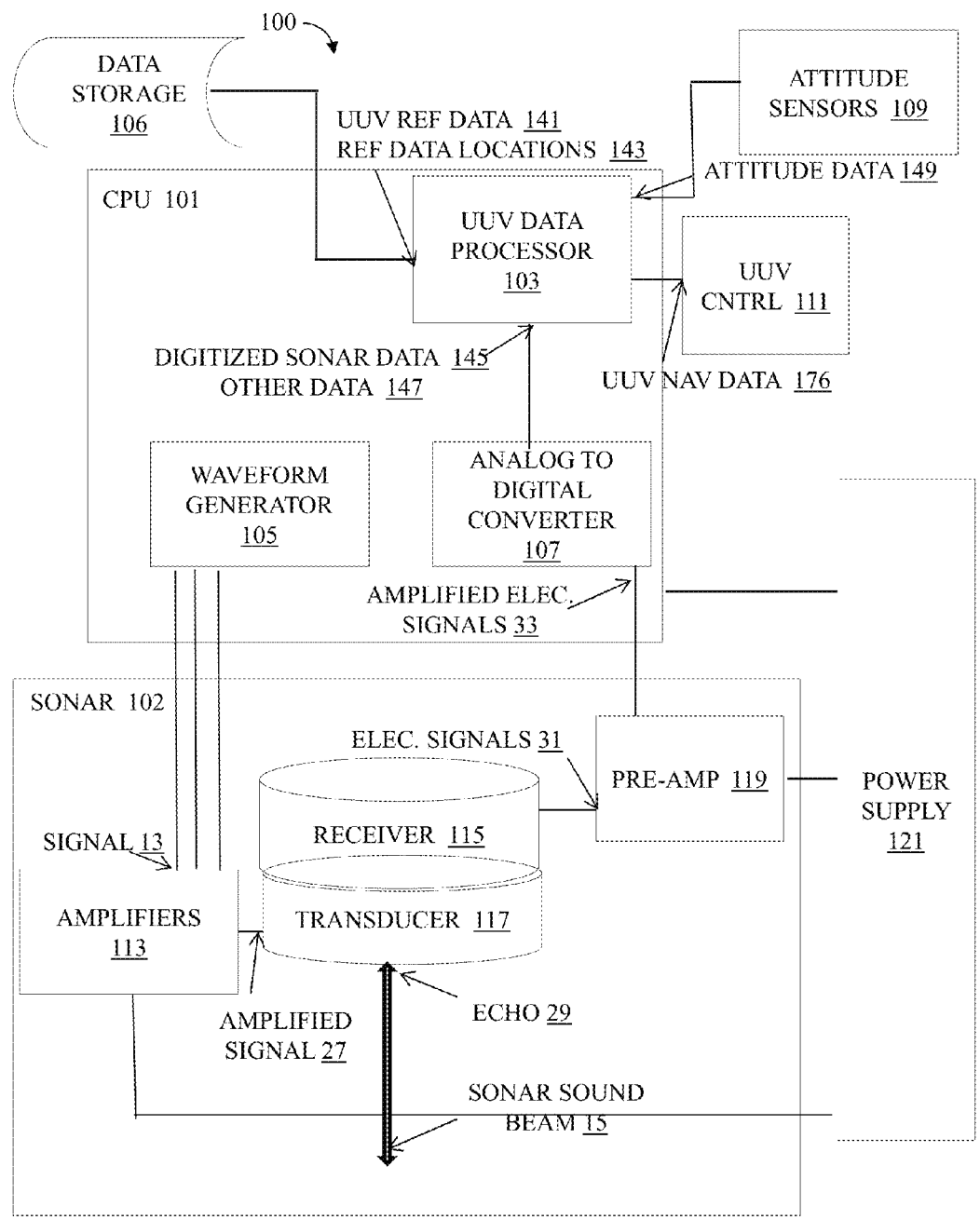
FIG. 1 is a schematic block diagram of the system of the present embodiment.
Figure 4:
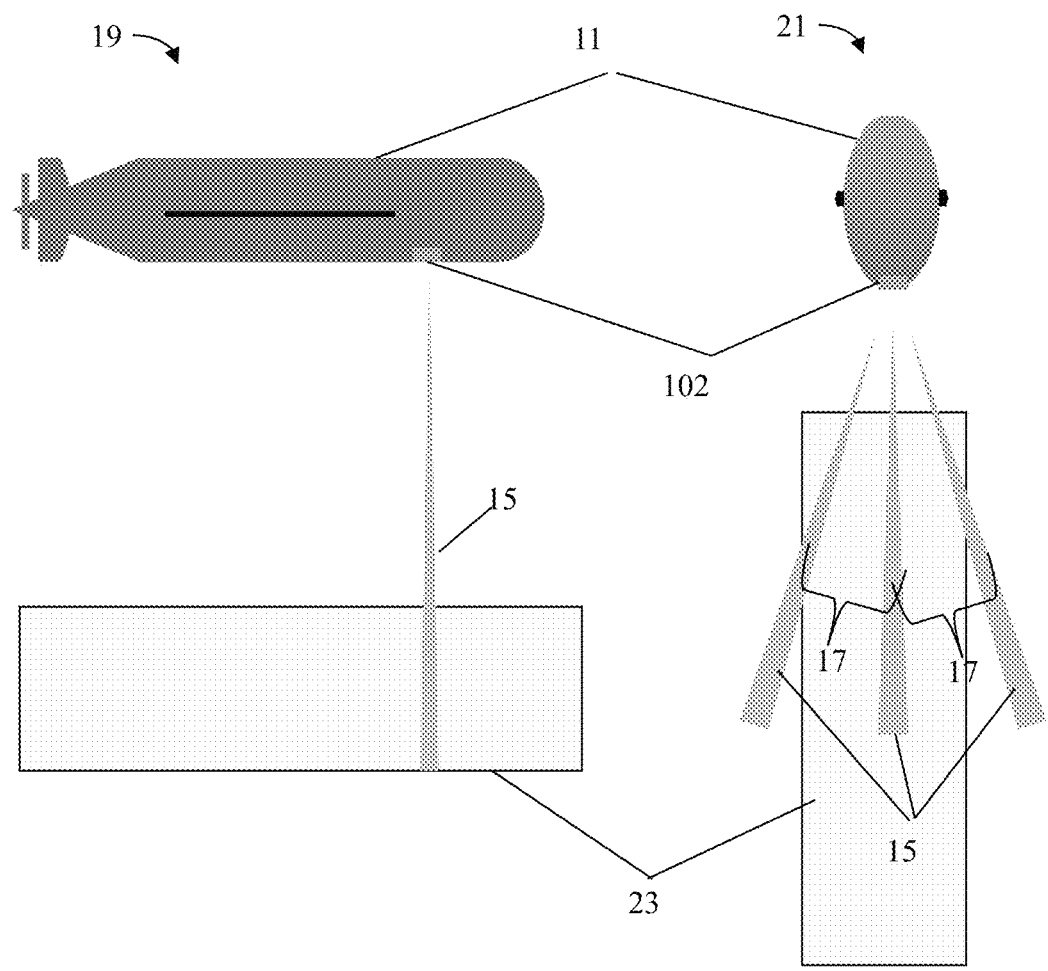
FIG. 4 are side and front views of the UUV of the present embodiment.
Figure 6:
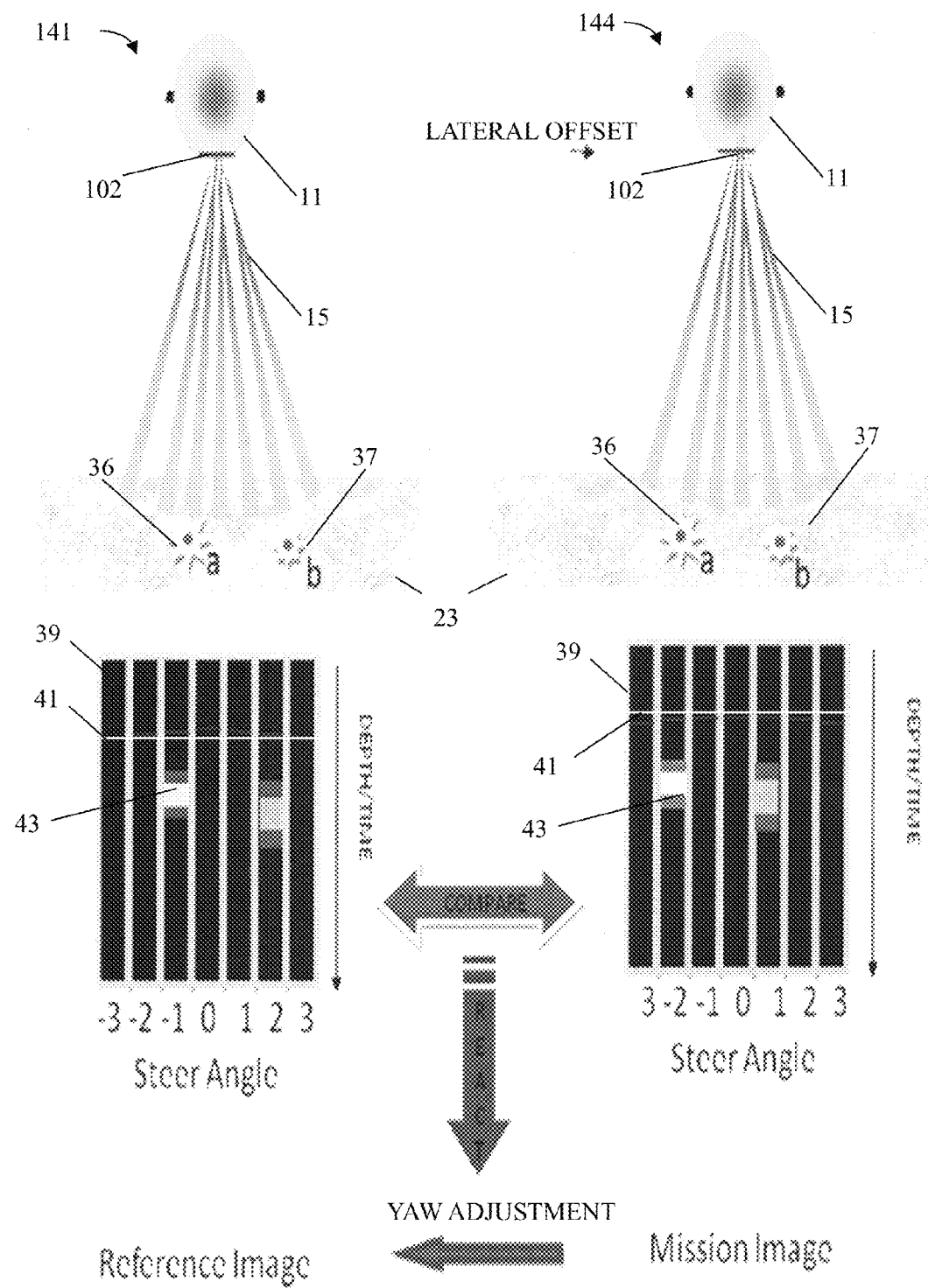
FIG. 6 is a comparison plan view of an operational use of the system of the present embodiment.

Referring now to FIG. 1, system 100 for acoustically sensing and exploiting sub-bottom features for navigation of unmanned undersea vehicles (UUVs) can include, but is not limited to including, beam steered downward looking sonar 102, attitude sensors 109, and control/processing unit (CPU) 101 for navigating UUV 11 through UUV controller 111. UUV controller 111, pre-amplifier 119, receiver 115, transducer 117, amplifiers 113, waveform generator 105, and analog to digital converter 107 are conventionally available and perform conventional functions. Sonar 102 (FIG. 4) of the present embodiment operates as follows. Waveform generator 105 creates signals 13 of the proper temporal and spectral form for bottom penetration and echolocation, as well as provides temporal delays used in beam steering. Amplifiers 113 amplify signals 13. Transducer 117 converts amplified signals 27 into sonar sound beam 15 that penetrates seafloor 23 (FIG. 4). Sonar beam 15 results in several echoes 29 from at least one sub-bottom feature 43 (FIG. 6). Receiver 115 converts echo 29 into electrical signals 31. Pre-amplifier 119 provides amplified electrical signals 33 for digitization by analog to digital converter 107, producing sonar data 145. UUV data processor 103 can compute UUV navigation data 176 based on UUV reference data 141 and UUV reference data locations 143 (provided by, for example, data storage 106), attitude data 149 provided by attitude sensors 109, and digitized data 145 and other data 147 provided by analog to digital converter 107. UUV data processor 103 can provide UUV navigation data 176 to UUV controller 111. Power supply 121 powers devices in system 100.

Figure 2:
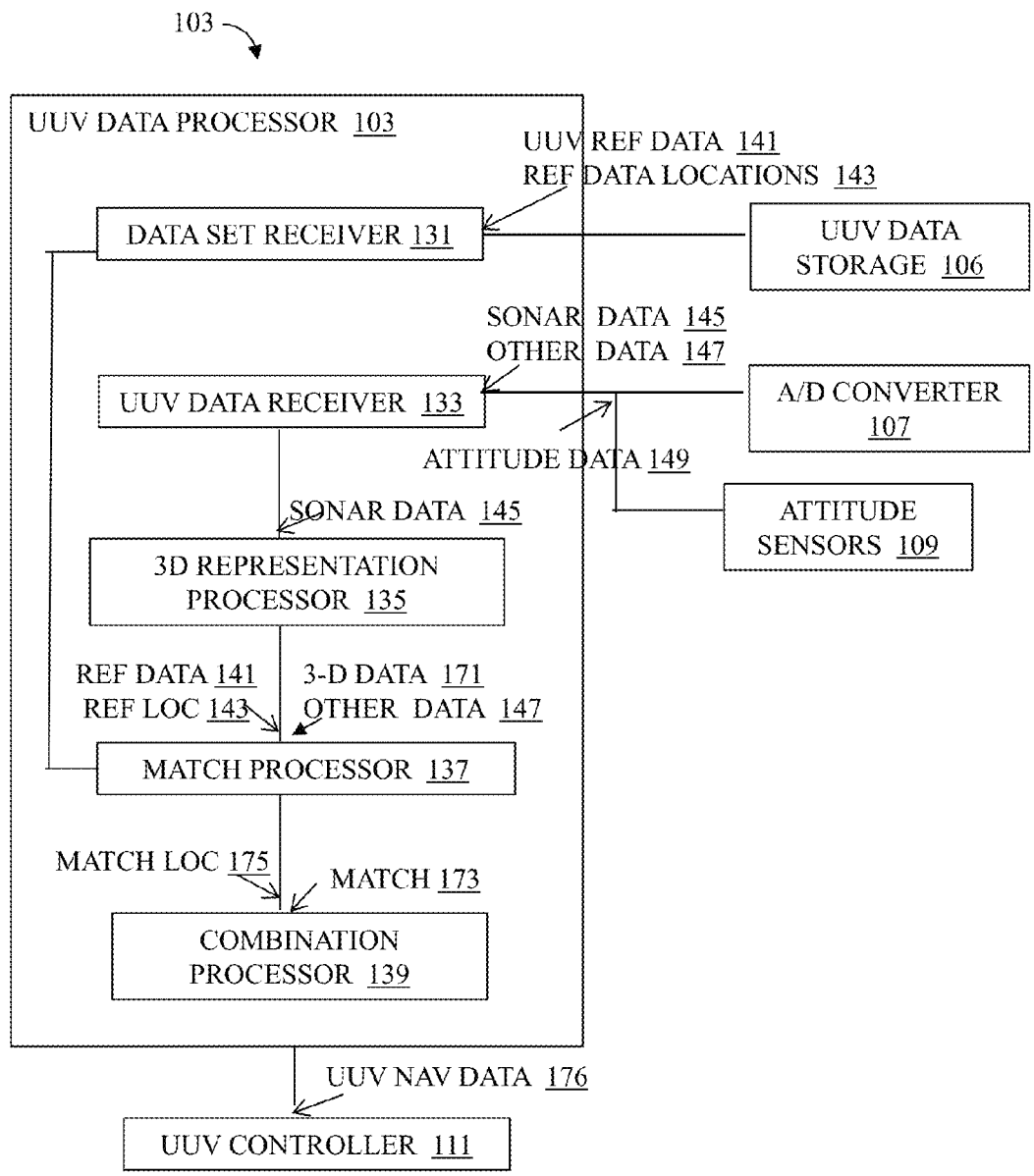
FIG. 2 is a schematic block diagram of the UUV data processor of the present embodiment.

Referring now primarily to FIG. 2, UUV data processor 103 for navigating a UUV can include, but is not limited to including, data set receiver 131 receiving a plurality of three dimensional acoustic reflectivity reference data sets 141 from UUV data storage 106, each of the plurality of reference data sets 141 being associated with a reference location 143. UUV data processor 103 can also include UUV data receiver 133 receiving sonar data 145 and other sensed data 147 from sonar 102. UUV data processor 103 can also include 3D representation processor 135 accumulating sonar data 145 to produce three-dimensional representation 171 of the at least one sub-bottom feature 43 (FIG. 6). UUV data processor 103 can still further include match processor 137 locating match 173 between three-dimensional representation 171 and one of the plurality of reference representations 141 at reference location 143. Match 173 is associated with match location 175. UUV data processor 103 can even still further include combination processor 139 combining match location 175 with other sensed data 147 to create UUV navigation data 176 and send it to UUV controller 111 to navigate UUV 11 (FIG. 4).

Figure 3:
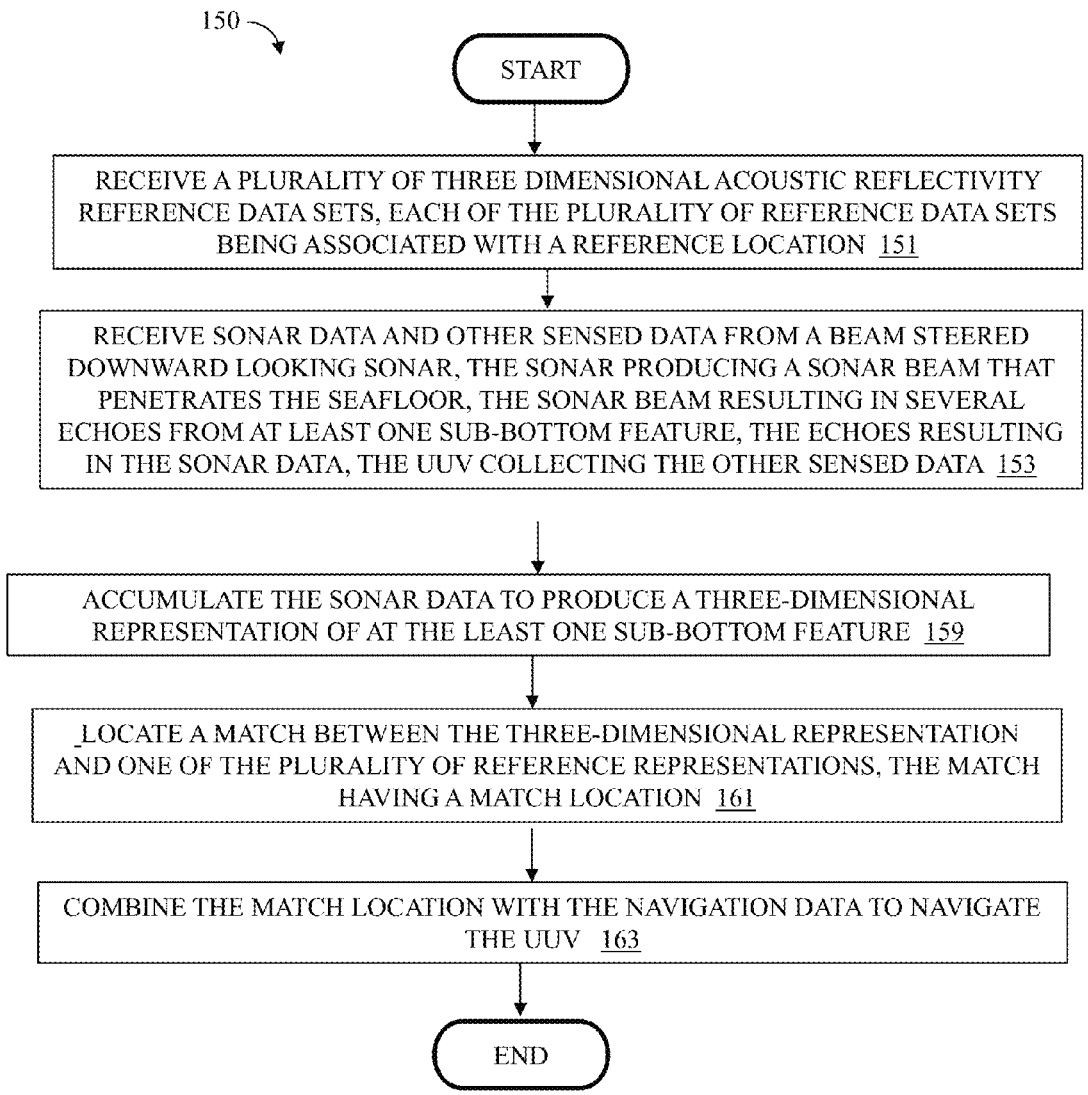
FIG. 3 is a flowchart of the method of the present embodiment.

Referring now primarily to FIG. 3, method 150 for navigating UUV 11 (FIG. 4) can include, but is not limited to including, receiving 151 a plurality of three dimensional acoustic reflectivity reference data sets 141 (FIG. 2), each of the plurality of reference data sets 141 (FIG. 2) being associated with a reference location 143 (FIG. 2), receiving 153 sonar data 145 (FIG. 2) and other sensed data 147 (FIG. 2) from beam steered downward looking sonar 11 (FIG. 4), the sonar producing a sonar beam 15 (FIG. 4) that penetrates the seafloor 23 (FIG. 4), the sonar beam 15 (FIG. 4) resulting in several echoes 29 (FIG. 2) from at least one sub-bottom feature 43 (FIG. 6), the echoes 29 (FIG. 2) resulting in the sonar data 145 (FIG. 2), the UUV 11 (FIG. 4) collecting the other sensed data 147 (FIG. 2). Method 150 can also include accumulating 159 the sonar data 145 (FIG. 2) to produce a three-dimensional representation 171 (FIG. 2) of the at least one sub-bottom feature 43 (FIG. 6), locating 161 a match 173 (FIG. 2) between the three-dimensional representation 171 (FIG. 2) and one of the plurality of reference representations 141 (FIG. 2), the match 173 (FIG. 2) having a match location 175 (FIG. 2), and combining 163 the match location 175 (FIG. 2) with navigation data to navigate the UUV 11 (FIG. 4).

Referring now primarily to FIG. 4, narrow angle, downward looking sonar 102 is mounted on the bottom of UUV 11, shown in side view 19 and front view 21. As UUV 11 moves forward, sonar beam 15 sweeps at athwartships angles 17 and penetrates seafloor 23, where sub-bottom features 43 (FIG. 6) can be revealed in the returned echo. Three sweep angles 17 are shown, but more sweep angles 17 could provide proportionally greater navigation assistance.

Figure 5:
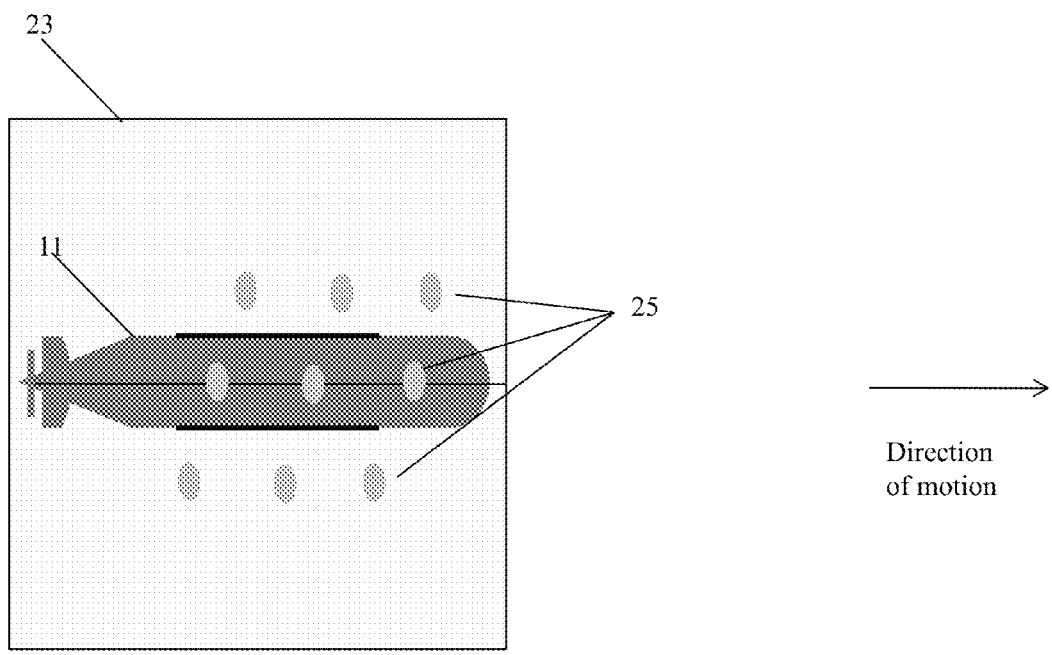
FIG. 5 is a plan view of the UUV sensing the seafloor in search of navigation aids.

Referring now to FIG. 5, each ping of sonar 102 (FIG. 4) can ensonify a different area of seafloor 23—"footprint" 25 of acoustic beams 15 (FIG. 4) on seafloor 23. As UUV 11 moves forward, a three dimensional image of seafloor 23 is compiled, the three dimensions being length (in direction of motion), width (athwart ship sweep angle) and depth. Attitude sensors 109 (FIG. 1) can provide attitude data 149 (FIG. 2) which can include, for example, estimates of vehicle roll and pitch. UUV navigation is based on attitude data 149 (FIG. 2) and other sensed data 147 (FIG. 2) (position, speed, heading).

Referring now to FIG. 6, navigation is accomplished by comparing the 3D mission images 144 of the sub-bottom with reference images 141. At each point along track 57 (FIG. 7) of UUV 11, reference image 141, either compiled by a pre-mission survey using similar sonar, or a map of sub-bottom features 43, can be used for comparison with mission image 144. When a map is available, sub-bottom features 43 like buried pipelines or communication cables may provide paths for navigation. As UUV 11 moves along its track 57 (FIG. 7), it compares each new look from sonar 102 at bottom 23 (FIG. 4) to reference image 141 of what bottom 23 (FIG. 4) should look like. Object a 36 and object b 37 can cause distinct returns in the sub-bottom echoes. Each ping at each different steer angle produces a history of energy reflected versus time, and can be diagrammed as one column 39 for each sweep angle 17. After each ping hits the bottom 41, sound continues as it travels deeper into seafloor 23, until it is reflected off sub-bottom feature 43. In reference image 141, the sub-bottom features 43 appear in beam −1. However, in mission image 144, during which UUV 11 approached at an offset as compared to reference image 141, sub-bottom feature 43 shows up in beam −2. By comparing, the offset is accounted for, and UUV 11 is directed to yaw so as to eliminate the offset. Note this example reduced the problem to two dimensions. In general, offsets occur in all three directions, and UUV 11 can be controlled along six degrees of freedom.

Figure 7:
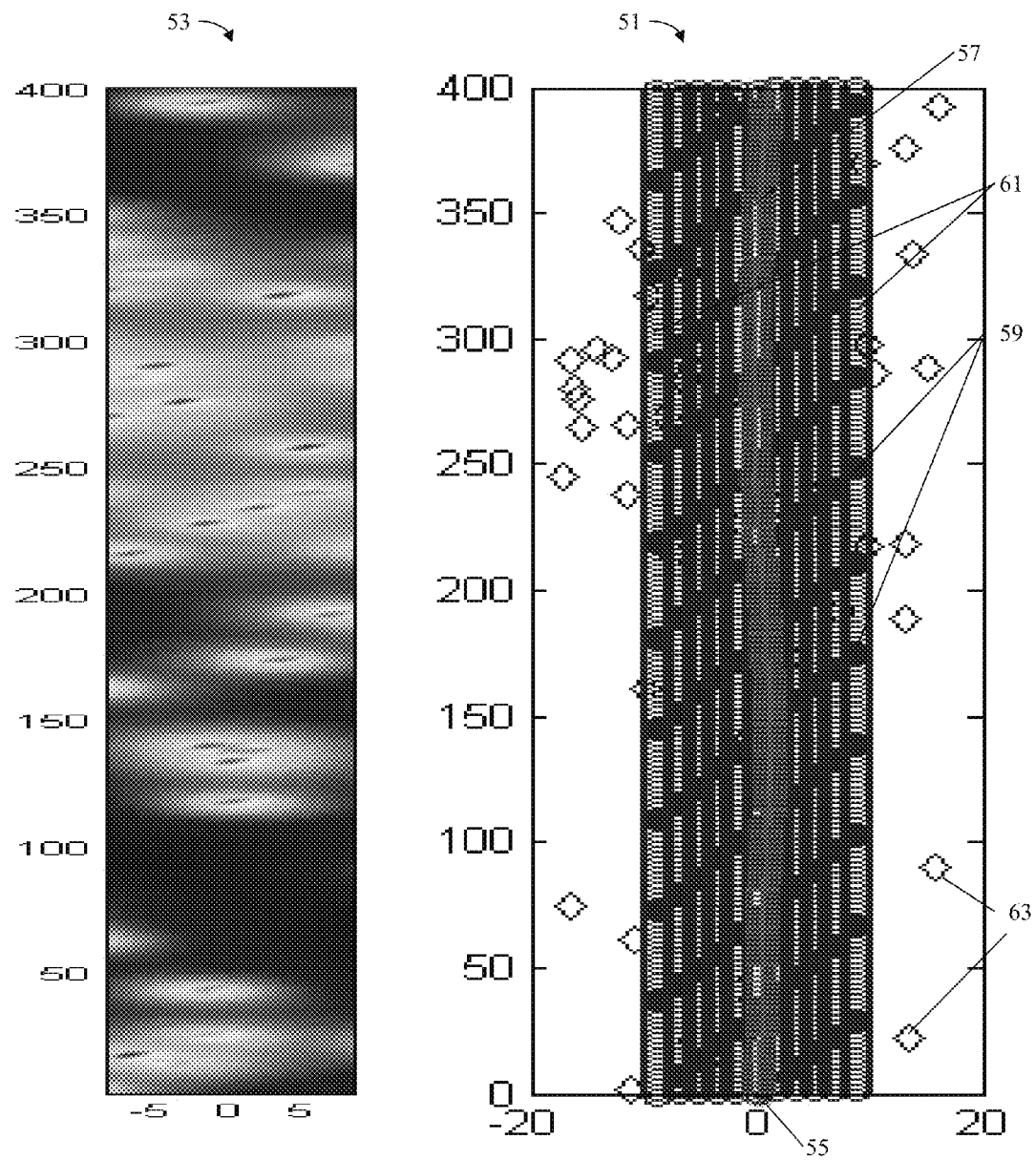
FIG. 7 is a graphical view of a simulation of based on the system of the present embodiment.

Referring now to FIG. 7, simulated image 51 of randomly distributed point scatterers 53 can be used as an exemplary reference image 141 (FIG. 5). A beam-steered sub-bottom sonar 102 (FIG. 6) can sense this type of image. If UUV 11 (FIG. 5) begins at track starting point 55 and attempts to maintain position, the result is navigated track 57. For this simulation, the vehicle is assumed to begin at pre-selected position, and has a 1° heading error and 1% speed error. Even using a crude tracking algorithm, the track can be maintained with less than 1 m RMS error. In this simulation, circles 59 mark the sonar footprint 25 (FIG. 5), there are eleven steering angles 61, one normal (steered directly below the vessel) and five on each side of track 57, and feature locations 63 are shown.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system can be written in any programming language. The system can operate on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described.

Referring again primarily to FIG. 3, method 150 can be, in whole or in part, implemented electronically. Signals representing actions taken by elements of system 100 (FIG. 1) and other disclosed embodiments can travel over at least one live communications network. Control and data information can be electronically executed and stored on at least one computer-readable medium, for example, but not limited to, data storage 106 (FIG. 1). The system can be implemented to execute on at least one computer node, for example, but not limited to, CPU 101 (FIG. 1) in at least one live communications network. Common forms of at least one computer-readable medium can include, for example, but are not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read.

Although the present teachings have been described with respect to various embodiments, it should be realized these teachings are also capable of a wide variety of further and other embodiments.

What is claimed is:

1. A method for navigating an unmanned undersea vehicle (UUV) equipped with a beam steered downward looking sonar, the method comprising:
   receiving a plurality of three-dimensional acoustic reflectivity reference data sets, each of the plurality of reference data sets being associated with a reference location;
   receiving sonar data and other sensed data, the sonar data resulting from at least one sub-bottom feature;
   accumulating the sonar data to produce a three-dimensional representation of the at least one sub-bottom feature;
   locating a match between the three-dimensional representation and one of the plurality of reference data sets, the match having a match location; and
   combining the match location with the other sensed data to navigate the UUV.

2. The method as in claim 1 wherein the plurality of three dimensional acoustic reflectivity reference data sets and the reference locations comprise pre-mission survey compilations.

3. The method as in claim 1 wherein the plurality of three dimensional acoustic reflectivity reference data sets and the reference locations comprise known sub-bottom features.

4. The method as in claim 1 further wherein the other sensed data comprise UUV position, UUV speed, UUV heading, and UUV attitude data.

5. The method as in claim 1 wherein the three dimensions of the three dimensional representation of the sub-bottom feature comprise feature length, feature width, and feature depth.

6. An unmanned undersea vehicle (UUV) for acoustically sensing and exploiting sub-bottom features for self-navigation comprising:
   a beam steered downward looking sonar collecting sonar data from at least one sub-bottom feature;
   sensors collecting sensed data;
   a data storage storing a plurality of three-dimensional acoustic reflectivity reference data sets, each of the plurality of reference data sets being associated with a reference location;
   a UUV data processor receiving the sonar data, the sensed data, and the plurality of three-dimensional acoustic reflectivity reference data sets and the reference locations, the UUV data processor accumulating the sonar data, the UUV data processor producing a three-dimensional representation of at least one of the sub-bottom features, the UUV data processor locating a match between the three-dimensional representation and one of the plurality of reference representations, the match having a match location, the UUV data processor preparing UUV navigation data based on the match location and the sensed data;
   a UUV controller navigating the UUV based on the UUV navigation data; and
   a power supply providing power to the UUV.

7. The UUV as in claim 6 further comprising:
   a central processing unit including the UUV data processor, a waveform generator, and an analog to digital converter.

8. The UUV as in claim 6 wherein the UUV data processor comprises:
   a data set receiver receiving the plurality of three-dimensional acoustic reflectivity reference data sets;
   a UUV data receiver receiving the sonar data and other sensed data;

a 3D representation processor accumulating the sonar data to produce a three-dimensional representation of the at least one sub-bottom feature;

a match processor locating the match between three-dimensional representation and one of the plurality of reference representations at the reference location; and a combination processor combining the match location with the sensed data to create the UUV navigation data, the combination processor sending the UUV navigation data to the UUV controller to self-navigate the UUV.

9. A computer program stored on a computer-readable and executed by a computer processor medium for navigating an unmanned undersea vehicle (UUV) comprising:

a data set receiver computer program receiving a plurality of three-dimensional acoustic reflectivity reference data sets, each of the plurality of reference data sets being associated with a reference location;

a UUV data receiver computer program receiving sonar data from at least one sub-bottom feature from a beam steered downward looking sonar, the UUV data receiver receiving other sensed data;

a 3D representation processor computer program accumulating the sonar data to produce a three-dimensional representation of the at least one sub-bottom feature;

a match processor computer program locating a match between the three-dimensional representation and one of the plurality of reference representations, the match having a match location; and a combination processor computer program combining the match location with the other sensed data to navigate the UUV.

10. The computer program as in claim 9 wherein the plurality of three dimensional acoustic reflectivity reference data sets and the reference locations comprise pre-mission survey compilations.

11. The computer program as in claim 9 wherein the plurality of three dimensional acoustic reflectivity reference data sets and the reference locations comprise known sub-bottom features.

12. The computer program as in claim 9 further wherein the other sensed data comprise UUV position, UUV speed, UUV heading, and UUV attitude data.

13. The computer program as in claim 9 wherein the three dimensions of the three dimensional representation of the sub-bottom feature comprise feature length, feature width, and feature depth.

* * * * *